United States Patent [19]

Apisdorf

[11] Patent Number: 5,193,347
[45] Date of Patent: Mar. 16, 1993

[54] HELMET-MOUNTED AIR SYSTEM FOR PERSONAL COMFORT

[76] Inventor: Yair J. Apisdorf, 1267 Worton Blvd., Mayfield Heights, Ohio 44124

[21] Appl. No.: 901,394

[22] Filed: Jun. 19, 1992

[51] Int. Cl.⁵ ............................................. F25B 21/02
[52] U.S. Cl. ..................................... 62/3.7; 2/171.3; 62/259.3
[58] Field of Search ................ 62/3.6, 3.62, 259.3, 62/3.7, 209; 2/171.3

[56] References Cited

U.S. PATENT DOCUMENTS

| | | | |
|---|---|---|---|
| 3,548,415 | 12/1970 | Waters | 62/259.3 X |
| 4,364,234 | 12/1982 | Reed | 62/3.7 X |
| 4,730,612 | 3/1988 | Dampney | 2/171.3 |

Primary Examiner—William E. Wayner
Attorney, Agent, or Firm—Alfred D. Lobo

[57] ABSTRACT

A single lightweight thermoelectric module (TEM) is mounted in a housing in turn mounted centrally atop a helmet to be worn by a worker in a hot atmosphere. The heat abstraction side of the TEM is disposed within the housing, the heat dissipation side dissipates heat to the ambient atmosphere. It has been found that the personal comfort of the worker is surprisingly improved by flowing a very small stream, 3-15 SCFM, of cooled air across only his face if the temperature of the air stream is in the range from about 1° F. to 7° F. cooler than the ambient air. This discovery allowed the air duct carrying cooled air from downstream the heat abstraction side of the TEM to be less than about 1 ft long, presenting substantially insignificant pressure drop of air flowing through the duct. This allows the use of a miniature fan means to blow the air through the housing. Two thermistors sense the temperature of air upstream and downstream, respectively, of the heat abstraction side of the TEM. A manual selection means allows the worker to set the temperature difference of air he wishes to be delivered to his face. Surprisingly, the hotter the ambient, the closer to the maximum temperature difference (set by the worker) is the air delivered to him.

14 Claims, 4 Drawing Sheets

HELMET-MOUNTED AIR SYSTEM FOR PERSONAL COMFORT

BACKGROUND OF THE INVENTION

There are numerous instances where a worker is forced to work in a less than pleasant atmosphere while he is performing a demanding task. Often, the atmosphere is not only contaminated with particulate matter, either solid or liquid, but also uncomfortably hot, in the range from 80° F. to 110° F. A welder in a welding room, a painter in a paint booth, a construction worker on a hot dusty dam-site, a coal miner in a coal mine, are examples of workers routinely subjected to heat and contaminated air. To ameliorate such a worker's condition, any improvement of his personal comfort, even if only a small enhancement, is greatly appreciated. In addition, breathing cooled (and correspondingly dehumidified) filtered air is more conducive to his health than breathing ambient air which is only filtered. Moreover, the use of the device of this invention by workers contributes greatly to meeting the OSHA regulations which apply to the aforementioned environments in which they work.

This invention evolved from an implementation of the concept that no matter how hot the workplace is, a very small difference in temperature, as little as 0.5° C., preferably from 1° C. to 4° C., and a very small flow of air in the range from 3 SCFM to 15 SCFM, across the face of a worker, will make a disproportionately large improvement in the feeling of comfort; more so, if the cooled, filtered air, cooler by only such a small difference in temperature, is slowly, substantially continuously flowed downwardly across the face of a worker, first cooling the forehead. With this concept it became unnecessary to specify a discharge temperature for cooled air to be supplied to the worker's headgear, and necessary only to maintain a ratio between the intake ambient temperature and the outlet discharge temperature of the cooled air. Most importantly, in the upper portion of the critical temperature range from 27° C.-43° C. (80° F.-110° F.) where a worker experiences progressively greater discomfort, cooler air relative to the ambient, is produced than in the lower portion of the range. For example, when the ambient air is 37.8° C. (100° F.) the device discharges cool air at about 33.9° C. (93° F.) when the ambient air is 80° F., the device discharges cool air at about 74.5° F. Stated differently, the worker gets cooler air than ambient.

Except in the relatively recent past, no effort was made to cool the air ducted to the worker, as for example in the ventilated welding helmet disclosed in U.S. Pat. No. 3,584,314.

More recently, improvement in the personal comfort of a worker is conventionally provided by ducting cooled and filtered air from an external source, removed from the ambient atmosphere in which the worker toils, through a duct which discharges the cool filtered air over his face. In a typical situation, cool, clean air is supplied from an air-conditioned "clean room" to an air manifold within the workroom. The ends of several individual air-ducts are manifolded to the air manifold, each duct connected at its other end to headgear, typically a helmet, worn by an individual worker. Even with a long air-duct, the mobility of the worker is restricted by the length of the duct which tethers him to the manifold. Such a connection to a manifold precludes easy access of the worker to a host of different physical situations. A more serious restriction is the danger associated with dragging an air-duct around a workplace which may contain machinery in which the air-duct might be entangled. Any air duct connected to an external source entails a safety problem because it may prove to be a dangerous encumbrance for a worker working with dangerous equipment.

To avoid connecting an air-duct to a manifold, there is commercially available a fresh-air system (available from Racal Health & Safety Inc.) which provides a belt-mounted blower and battery. One or more air filters are removably disposed on the intake of the blower and the discharge is ducted through an air-duct to the top of a helmet, and thence downwardly across the face of the wearer, between the air-impermeable face mask and his face. Because air blown across the face of the worker is at ambient temperature, the cooling effect relied upon is that of a fan which circulates ambient air; and because air discharged from the fan must travel through several feet (about a meter) of air-duct, the blower must be large enough not only to blow a large volume of air, but also to overcome the pressure drop through the relatively long air-duct.

It seemed that an air-cooling and air-filtration system which could be relatively unobtrusively carried on the person of a worker should meet the need for a self-contained air-cooling and filtering system. Except that, under the circumstances, not many devices could be adapted to fill such a need.

The Peltier-effect has been used in heat pumps for heating or cooling of spaces and of materials under circumstances where a conventional fluid-refrigeration cycle is disadvantageous. Whether used to heat or cool, depends upon the polarity of the unidirectional electrical energy supplied to a thermoelectric module by conductors. When one side of the Peltier thermoelectric module used in this invention is energized, it will become hot and the other side will become cold. For the purpose of this invention, the module is arranged with the cold side in heat-conductive association with the intake of a cooling air duct. The hot side is thermally associated with ambient air so that heat from the module is discharged to the ambient air.

In a thermoelectric module ("TEM" for brevity), a cold junction is produced where heat is absorbed by electrons while moving from a lower energy state to a higher energy state. A power supply provides the energy required to move electrons through the energy state system. A heat exchanger is attached to a hot junction to expel excess heat. When the Peltier-effect is used in a heat pump, the Peltier battery or pile is associated with a heat sink or heat exchanger jacket to which the heat is promoted, the heat exchanger being provided with ribs, channels or the like to facilitate the heat transfer to or from the Peltier pile over a large surface of high thermal conductivity.

The use of such thermoelectric heat pumps is limited to situations arising out of special considerations such as size, space, weight, environmental considerations, etc. This invention provided just such a special consideration, and the commercial availability of a single TEM, small enough to be mounted within a helmet-mounted housing, yet powerful enough to supply a mass-flow of cool air to minimize the discomfort due to heat and humidity, of a worker who is required to wear headgear restricting the flow of air about his face, especially in hot or dusty areas, spurred the utilization of such a module.

SUMMARY OF THE INVENTION

It has been discovered that a small cool stream of air in the range from 0.085–0.425 meters³/min (3 SCFM to 15 SCFM), flowing downwardly continuously across the face of a person wearing a face shield, who is subjected to an ambient temperature in the range from about 27° C. to about 43° C. (80° F.–110° F.), will provide a high degree of comfort, sufficient to keep the person comfortable, if the temperature of the cool air is only from about 0.5° C.–4° C. (1° F.–7° F.) cooler than the ambient.

It has also been discovered that the requisite small flow of relatively cooler air than ambient, flowing through a narrow restricted zone between a person's face and the face-shield he is wearing, can be provided by a single TEM in a Peltier effect-based device so small that it can be mounted on headgear worn by a person, and, so undemanding of electrical power that the solid state heat pump can be operated substantially continuously for at least 8 hr by a body-worn battery pack, before it is recharged. Such a combination of helmet-mounted cooling device and body-worn battery pack affords untethered personal mobility, that is, freedom to move without being connected by electrical wiring or air ducts to a source of electricity or air, respectively, the location of which source is fixed.

It is therefore a general object of this invention to provide a device constructed for the purpose of flowing air unidirectionally downwardly across the face of a worker, the device capable of providing no more air than is required to provide the requisite comfort afforded thereby; and to provide helmet-mounting means so closely disposed relative to the worker's face as to essentially negate any pressure drop through an air conduit supplying cooled air to his face.

It is a specific object of this invention to provide a Peltier-effect cooling system integrally combined with an air-filter means, together so lightweight and compact, that it can be integrally mounted on a helmet so that no source of electrical power not carried on the person of the wearer of the helmet, is necessary.

It has also been discovered that it is unnecessary to specify a cooled air temperature discharged from a housing in which a TEM is mounted, if only the ratio of temperatures of the ambient air and cooled air thermistors is maintained.

It is therefore a specific object of this invention to provide a rechargeable battery to power a TEM for generating cooled air in a Peltier-effect-based device of unitary construction with an air-filter means, which device though miniaturized, is surprisingly effective when used with correspondingly small temperature control means in combination with first and second thermistors which sample ambient and cooled air, respectively, and a comparative circuit, which combination minimizes the size and weight of the controller and power supply.

In a specific embodiment, the apparatus of this invention comprises: a body-mountable device for maintaining personal comfort of a person subjected to heat while wearing a helmet, by flowing cooled ambient air across said person's face only. The device comprises, battery means removably mounted on said body; a housing mounted on the surface of said helmet, said housing having an intake end for ambient air, and a discharge end for cooled air; fan means mounted within said housing, adjacent said intake end, and electrically connected to said battery means for selective on/off operation; thermoelectric module means mounted through the wall of said housing and electrically connectable to said battery means, said module having a heat dissipation side, and, a heat abstraction side disposed within said housing, said heat abstraction side being in heat-conducting association with air flowing through said housing; a first thermistor, upstream of said heat abstraction side, in temperature sensing association with air flowing through said intake end of said housing; a second thermistor, downstream of said heat abstraction side, in temperature sensing association with air flowing to said discharge end; manual selection means for selecting the temperature of air discharged from said housing; temperature control means in operative communication with said manual selection means and said first and second thermistor means, and adapted to maintain a predetermined temperature difference between said first and second thermistors by regulating current supplied to said module, wherein such regulation of current is responsive to said manual selection means and the temperatures sensed by said first and second thermistors; air-duct means attached at its one end to said discharge end of said housing, its other end terminating in front of said person's face to flow cooled air across said face; whereby said person wearing said helmet has untethered mobility.

The circuit of the device makes it possible to get maximum relative cooling when the ambient temperature is highest. For example, a 90° F. ambient temperature and a desired temperature setting of 7° F., the temperature controller provides a temperature difference of 6.3° F. indicating the actual temperature of air leaving. With a 70° F. ambient temperature and a desired temperature setting of 7° F., the temperature controller provides a temperature difference of 4.9° F. indicating the actual temperature of air leaving.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations, like reference numerals refer to like elements, and in which.

DETAILED DESCRIPTION OF THE PREFERRED EMBODIMENTS

The invention maintains comfort by flowing cooled air downwardly across the face of the worker, where the temperature of the cooled air is automatically controlled so that it is different from the room air temperature by an amount specified by the worker. Further-more, the configuration of the invention is such that it is entirely self-contained and portable, this being made possible by the use of a miniaturized Peltier device for cooling, by a small, efficient temperature controller, and by the discovery that it is the temperature difference between the room air and the cooled air which is responsible for maintaining worker comfort, not the absolute temperature of the cooled air.

Though prior the art includes many Peltier-effect based devices for numerous purposes, none is directed to solving the problem addressed by this invention; and none is based upon maintaining a preselected small temperature difference rather than specifying an absolute temperature of the discharged cool air. Maintaining a temperature difference requires less power and allows miniaturization of the apparatus so that it can be carried by the worker. A lightweight, portable device which does not require external sources of power should also have a low power consumption, since energy storage devices typically have a high ratio of weight to energy stored.

Figure 1:
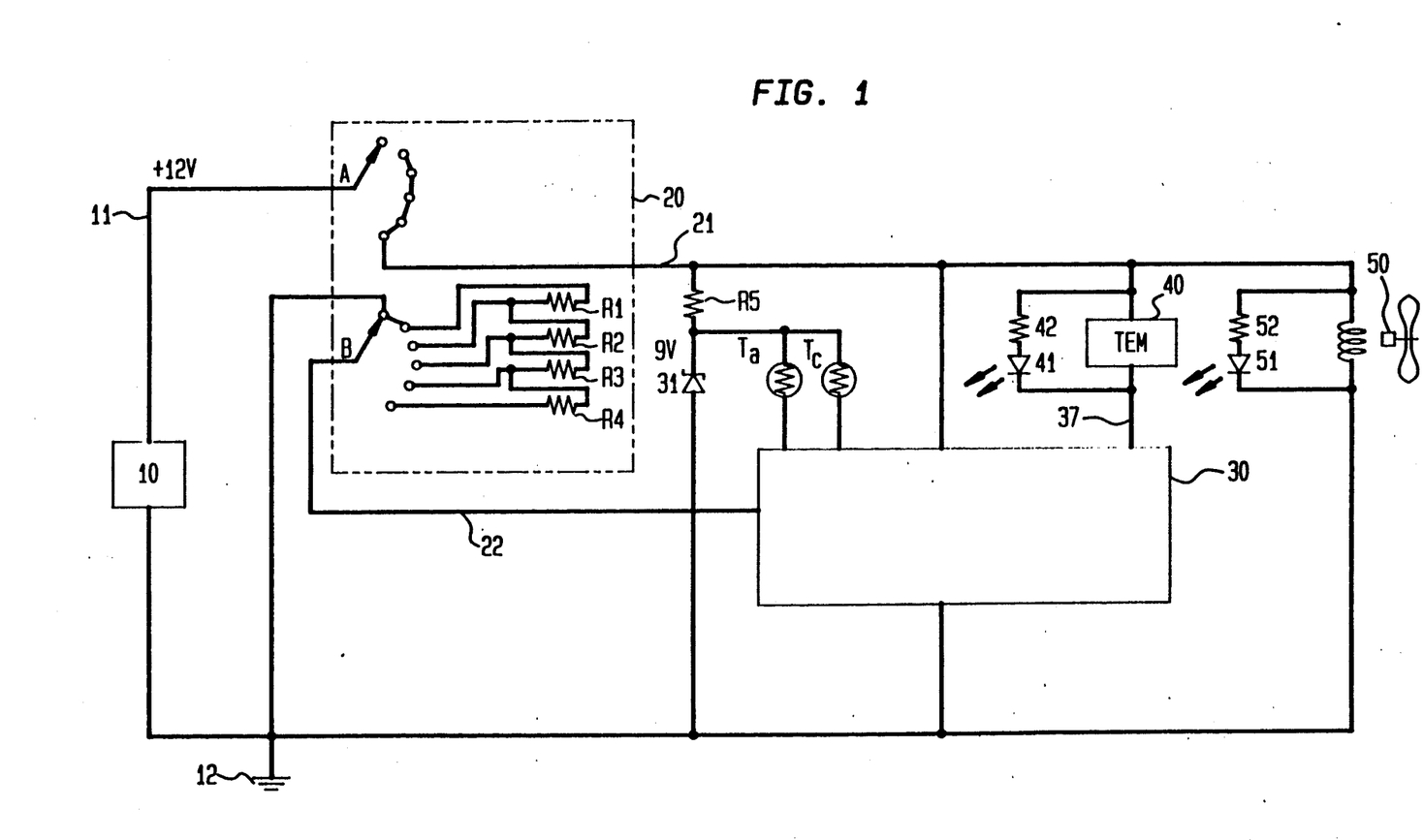
FIG. 1 is a schematic diagram of a preferred embodiment of the invention.

The electrical schematic shown in FIG. 1 is illustrative of a preferred embodiment of the invention, in which power from power supply 10 is obtained from positive terminal 11 and ground terminal 12. The positive terminal is coupled to pole A of manual switch 20, which serves as an on/off switch for the entire device. The output 21 of manual switch 20 pole A is coupled directly to: the thermistor series resistor R5, the temperature controller 30, the Peltier device or Thermoelectric Module TEM, and subminiature fan 50.

The other side of thermistor series resistor R5 is coupled to thermistor voltage regulator 31 (a 9 V Zener diode in this embodiment), ambient air thermistor Ta, and cooled air thermistor Tc. On its other side, the thermistor voltage regulator 31 is coupled to power supply ground terminal 12. The output of each thermistor (Ta and Tc) is coupled to an input to temperature controller 30.

A light emitting diode (LED) 41 and LED series resistor 42 shown in FIG. 1 are wired in series relative to one another, and in parallel to the TEM 40. Similarly, fan LED 51 and the fan LED series resistor 52 are in parallel to fan 50. The TEM 40, TEM LED 41, and TEM LED series resistor 42 are powered on the positive side by output wire 21 from manual switch 20 pole A, and are controlled on the other (negative) side by temperature controller 30 output wire 37. The fan 50, fan LED 51, and fan LED series resistor 52 are both powered and controlled by manual switch 20 output wire 21. Note that LED 41, LED 51, and LED series resistors 42 and 52 may be optionally removed from the circuit.

The temperature controller 30 and fan are coupled directly to ground terminal 12.

Inspection of FIG. 1 shows that all throws of pole A of manual switch 20 are coupled directly to output wire 21, except for the first switch position, which is completely unconnected and constitutes an "off" position for the entire circuit. All manual switch 20 positions other than the first position electrically connect the positive battery terminal 11 to the rest of the circuit via pole A and manual switch output 21. Preferably the battery weighs no more than about 4 lb (2 Kg).

Pole B of manual switch 20 provides an input to temperature controller 30 via the setpoint output wire 22. The first and second positions of manual switch 20 pole B are coupled directly to ground. Subsequent positions of switch 20 add setpoint resistors R1, R2, R3, and R4 in series between the temperature controller 30 and ground terminal 11.

The circuit shown in FIG. 1 operates to maintain a desired temperature difference, if any, between the ambient thermistor Ta and the cooled thermistor Tc. This is accomplished primarily by the action of temperature controller 30 in response to changes in the comparative resistances of thermistors Ta and Tc, and by the position of manual switch 20. Power is provided to the device by power supply 10, which has a rated capacity of 4.5 amp-hours in the preferred embodiment.

A reference voltage of 9 V is supplied by the thermistor voltage regulator 31 to both ambient air thermistor Ta and cooled air thermistor Tc, so that the voltage supplied to the thermistors will be independent of small variations in the power supply voltage. The thermistor series resistor R5 shown in FIG. 1 limits the current drawn by thermistor voltage regulator 31 and thermistors Ta and Tc, and thereby conserves battery power. In the preferred embodiment, a value of 2.7K for thermistor series resistor R5, combined with thermistors Ta and Tc each of which has a resistance of about 10K at 25° C., and the internal resistance of temperature controller 30, results in a total current through R5 of only 1.11 mA and only 0.17 mA "wasted" through thermistor voltage regulator 31. This small power consumption by the temperature sensing portion of the circuit shown in FIG. 1 is important to the efficiency of the invention and therefore the minimization of the size and weight of the power supply. During operation of the invention, typical output voltages of thermistors Ta and Tc to temperature controller 30 are approximately 4 V to 5 V.

Thus it is seen that there is a sufficiently high resistance in the circuit so that with a given power source, there is essentially no leakage of current. This is a key consideration relating to conserving the battery and permitting extended use of the device during an 8 hr shift.

The entire device is considered to be "off" when manual switch 20 is in its first position. In this position, no power is delivered to the circuit via conductor 21.

When manual switch 20 is in any position but the first position, inspection of FIG. 1 reveals the fan 50 will be powered via pole A, and will run. Additionally, the fan LED 52 will be illuminated. The purpose of fan LED series resistor 51 is to limit the current passing through the LED.

Temperature controller 30 is constructed such that direct grounding of manual switch 20 output wire 22 via pole B will result in the application of no current to TEM 40 via temperature controller output 37, which will therefore provide no cooling effect. See the description accompanying FIG. 2 for temperature controller operational details.

When manual switch 20 is in the first two switch positions, the manual switch output 22 to temperature controller 30 is coupled directly to ground. As stated hereinabove, grounding of manual switch output 22 causes the temperature controller to shut-down TEM 40. Thus, "fan only" operation occurs when the manual switch is in its second position, while the first position represents a complete shut-down of the device.

When manual switch 20 is in its third position, the device of FIG. 1 is considered to be in the "minimal cooling" mode. In this mode, setpoint resistor R1 (approximately 5.1K) is placed in series between ground terminal 12 and manual switch output 22 to temperature controller 30. Temperature controller 30 reacts so that the current supplied to TEM 40 by temperature controller output 37 is sufficient to cause increased cooling by TEM 40 until the temperature measured by "cooled air" thermistor Tc is approximately 2% (°F.) cooler than the temperature measured by the "ambient air" thermistor Ta. Additionally, TEM LED 41 is illuminated in all cooling modes. The purpose of TEM LED series resistor 42 is to limit the current passing through LED 41.

Device operation when manual switch 20 is in the fourth position is termed "low cooling" mode, and is essentially similar to "minimal cooling" mode, except that low cooling resistor R2 (approximately 150 ohms) is placed in series with the minimal cooling resistor R1, thus increasing the resistance sensed by the temperature controller via manual switch output 22. In "low cooling" mode, the temperature controller reacts to keep the cool air thermistor Tc at a temperature approximately 3.5% (°F.) lower than that of the ambient air thermistor Ta.

Device operation when manual switch 20 is in the fifth position is termed "medium cooling" mode, and places medium cooling resistor R3 (approximately 150 ohms) in series with minimal cooling resistor R1 and low cooling resistor R2. In "medium cooling" mode, cool air thermistor Tc is maintained at a temperature approximately 5% (°F.) lower than the temperature of ambient air thermistor Ta.

Device operation when manual switch 20 is in the sixth and last position is termed "maximum cooling" mode, and places maximum cooling resistor R4 (approximately 150 ohms) in series with resistors R1, R2, and R3. In "maximum cooling" mode, cool air thermistor Tc is maintained at a temperature approximately 6% (°F.) lower than that of ambient air thermistor Ta.

It should be emphasized that for a given position of manual switch 20, temperature controller 30 maintains the temperature of cooled air thermistor Tc so that its temperature measured in °F. is a fixed percentage of the temperature of the ambient air thermistor Ta measured in °F., thus providing the unexpected benefit of increased cooling (and comfort) at higher ambient temperatures. For example, the "maximum cooling" position of manual switch 20 results in a 6% reduction of the air temperature measured by Tc relative to the air temperature measured by Ta. At an ambient temperature of 80° F., the cooled air therefore reaches a temperature of 75.2° F., or a difference of 4.8° F. At an ambient temperature of 100° F., the cooled air reaches a temperature of 94° F., or a difference of 6° F.

Figure 2:
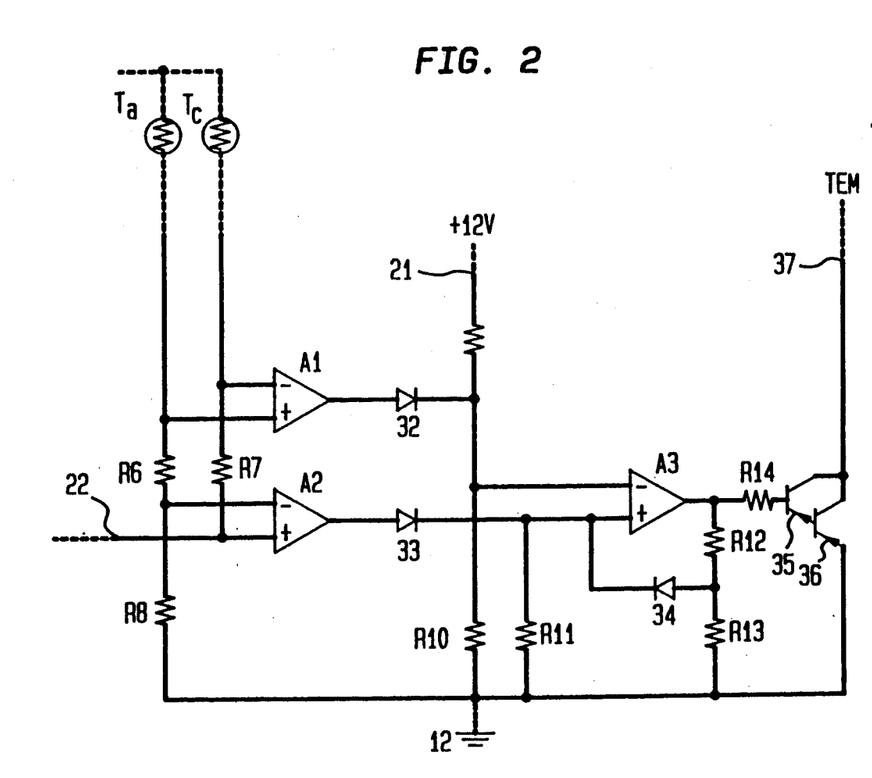
FIG. 2 is a schematic diagram showing details of the temperature controller.

FIG. 2 is a detailed schematic of temperature controller 30, showing how a comparison of thermistor voltages combined with a comparison of setpoint resistance voltages results in control of TEM 40, and in which:

the output of ambient air thermistor Ta is coupled to the noninverting input to temperature difference operational amplifier A1, and is also coupled to the positive side of voltage divider resistor R6;

the output of cooled air thermistor Tc is coupled to the inverting input to temperature difference operational amplifier A1, and is also coupled to the positive side of voltage divider resistor R7;

the manual switch 20 output conductor 22 is coupled to the noninverting input to setpoint difference operational amplifier A2, and is also coupled to the negative side of voltage divider resistor R7;

the setpoint reference resistor R8 is coupled to the negative side of voltage divider resistor R6, and is also coupled to the negative terminal 12;

the output of temperature difference operational amplifier A1 is coupled to the positive side of diode 32, so that current may only flow out the A1 output;

the other side of diode 32 is coupled to the negative side of voltage divider resistor R9, the positive side of voltage divider resistor R10, and the inverting input of driver operational amplifier A3, where the positive side of R9 is coupled to power output 21 of manual switch 20 and where the negative side of R10 is coupled to ground terminal 12;

the output of setpoint difference operational amplifier A2 is coupled to the positive side of diode 33, so that current may only flow out the A2 output;

the other side of diode 33 is coupled to the positive side of damping resistor R11, the noninverting input of driver operational amplifier A3, and the negative side of driver latching diode 34, where the negative side of R11 is coupled to ground terminal 12;

the output of driver operational amplifier A3 is coupled to the positive side of driver latching resistor R12 and driver output limiting resistor R14;

the negative side of driver latching resistor R12 is coupled to the positive side of driver latching diode 34 and driver latching drain resistor R13, where the driver latching drain resistor is coupled on its other side only to ground terminal 12;

the other side of driver output limiting resistor R14 is coupled to the base of first stage npn bipolar junction transistor (BJT) 35;

the emitter of BJT 35 is coupled to the base of second stage npn BJT 36, so that BJT 35 and BJT 36 constitute a Darlington;

the emitter of BJT 36 is coupled to ground terminal 12;

the collectors of both BJT 35 and BJT 36 are coupled to temperature controller output 37 to TEM 40.

Referring to FIG. 2 and the following discussion, it will be made apparent that temperature controller 30 works by latching into an "on" or "off" state, where this state is dependent upon the resistances of thermistors Ta and Tc, and upon the resistance provided by manual switch 20 pole B setpoint series resistors R1, R2, R3, and R4.

Three operational amplifiers are shown in FIG. 2: A1, A2, and A3. All three are analog amplifiers operated in their voltage comparator modes with no negative feedback, so that any net positive input to an amplifier will result in a "saturated" output of 9 volts from that amplifier. Amplifier A1 functions as a TEM 40 shutdown switch, and produces a positive output only when cooled air thermistor Tc is sufficiently cool relative to ambient air thermistor Ta. Amplifier A2 functions as a TEM 40 startup switch, producing a positive output only when thermistor Tc is sufficiently warm relative to ambient air thermistor Ta. The output of amplifier A3 drives TEM 40, in logical response to inputs to amplifier A3 from amplifiers A1 and A2. Latching diode 34 provides stability to the output of amplifier A3 by holding it in the "on" state with positive feedback until amplifier A3 receives a 9 volt input (in this specific case) from amplifier A1.

At the startup of temperature controller 30, thermistors Ta and Tc are typically at the same temperature and will have similar resistances, while manual switch pole B has been adjusted so that there is a "setpoint"

resistance coupled to conductor 22 between the noninverting input of amplifier A2 and ground. The "setpoint" resistance referred to herein consists of a series combination of resistor R1 with setpoint resistors R2, R3, and/or R4, as previously described in the discussion of FIG. 1 and manual switch 20. In all of the invention's cooling modes, the total setpoint resistance is greater than the resistance of the setpoint reference resistor R8, thus causing more current to flow through thermistor Ta than through thermistor Tc at startup. The greater current flow through thermistor Ta results in a larger voltage drop across thermistor Ta than across thermistor Tc, so that the voltage at the inverting input to amplifier A1 is greater than the voltage at the noninverting input to A1. The output of amplifier A1 at startup is therefore zero volts, and the inverting input to amplifier A3 is held at approximately 1 volt by voltage divider resistors R9 and R10. At startup, the voltage drop across the setpoint resistance is greater than the voltage drop across the setpoint reference resistor R8, so that the noninverting input of amplifier A2 is at a higher voltage than the inverting input of A2. The output of amplifier A2 is therefore approximately 9 volts, and the noninverting input of amplifier A3 is also 9 volts. Since the inverting input of amplifier A3 is at only 1 volt, the output of amplifier A3 is approximately 9 volts. A current flows from the amplifier A3 output, through driver output limiting resistor R14, and into the Darlington bipolar junction transistors 35 and 36, resulting in a current of approximately 2 amps supplied to TEM 40 via conductor 37.

Following startup, TEM 40 cools thermistor Tc. As thermistor Tc cools, its resistance increases and the current passing through the setpoint resistance is decreased. When the current passing through the setpoint resistance has decreased sufficiently, the voltage at the noninverting input to amplifier A2 becomes less than the voltage at the inverting input to amplifier A2 and the output of amplifier A2 goes to zero volts. The noninverting input to amplifier A3 does not drop to zero volts, however, because the latching circuit consisting of diode 34 and resistors R12 and R13 provides a positive feedback of approximately 4.5 volts from the output of amplifier A3 to its noninverting input. Since the inverting input to amplifier A3 is still at 1 volt, A3 continues to produce an output of 9 volts and TEM 40 continues to receive a current of approximately 2 amps.

When TEM 40 has cooled thermistor Tc to the desired setpoint temperature, the resistance of thermistor Tc is sufficiently high so that its voltage drop is greater than the voltage drop across thermistor Ta. Since the noninverting input to amplifier A1 is now greater than the inverting input to A1, both the output of amplifier A1 and the inverting input to amplifier A3 go to 9 volts. The latching circuit only holds the noninverting input of A3 at 4.5 volts, so the voltage at the inverting input to amplifier A3 is now greater than the voltage at the noninverting input, and the output of A3 goes to zero volts. The latching circuit no longer supplies 4.5 volts to the noninverting input to amplifier A3, and no current is supplied to TEM 40.

When air flow through the invention warms thermistor Tc, its resistance is lowered so that: the current through the setpoint resistance is increased, the voltage drop across the setpoint resistance is increased, and the voltage at the noninverting input to amplifier A2 is increased. Thus, when thermistor Tc has warmed sufficiently, the voltage at the noninverting input to amplifier A2 is greater than the voltage at the inverting input to A2, and the output of A2 goes to 9 volts. This results in another startup of temperature controller 30 and begins a new control cycle.

Figure 3:
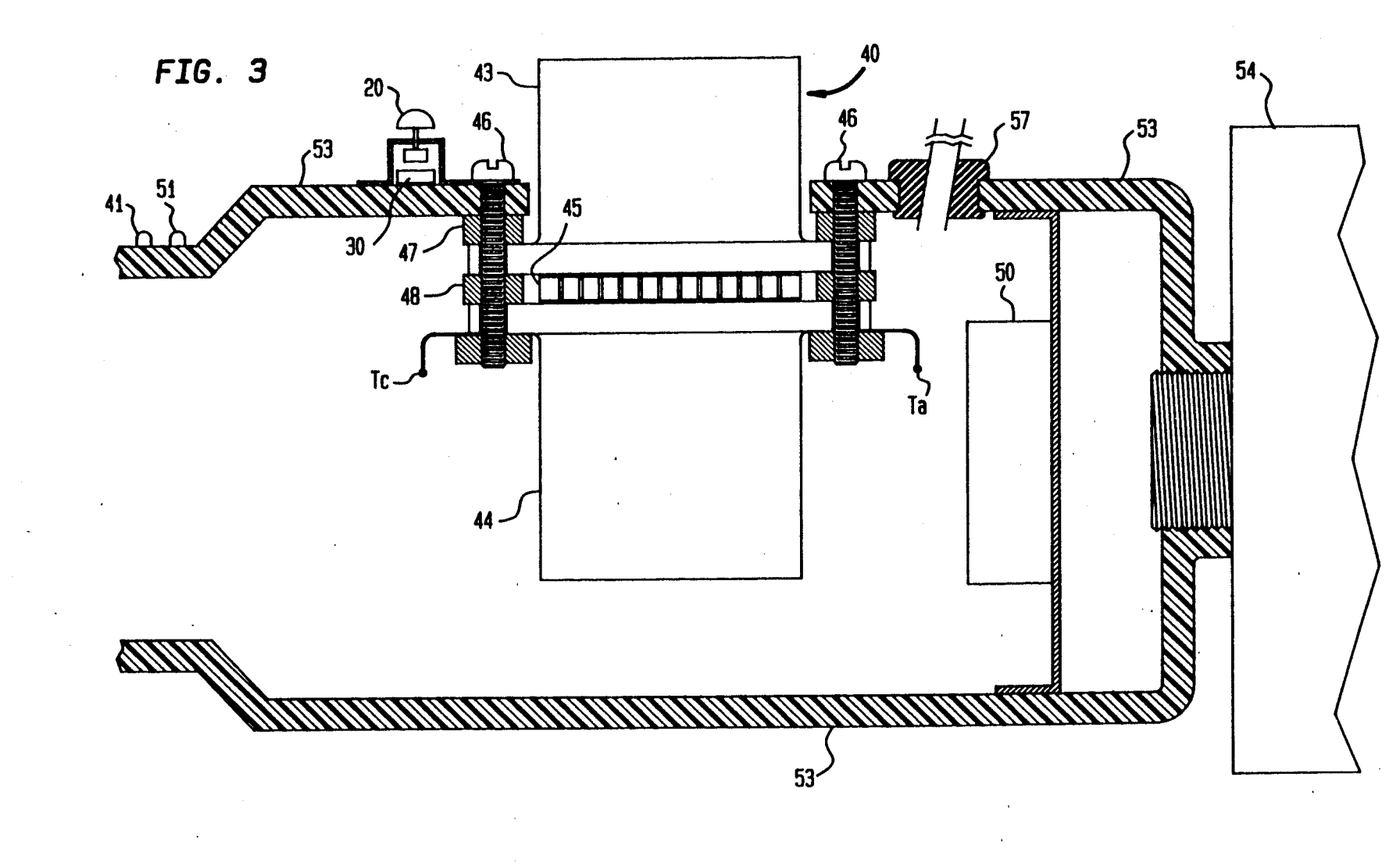
FIG. 3 is a longitudinal cross-sectional of the housing of a preferred embodiment.
Figure 4:
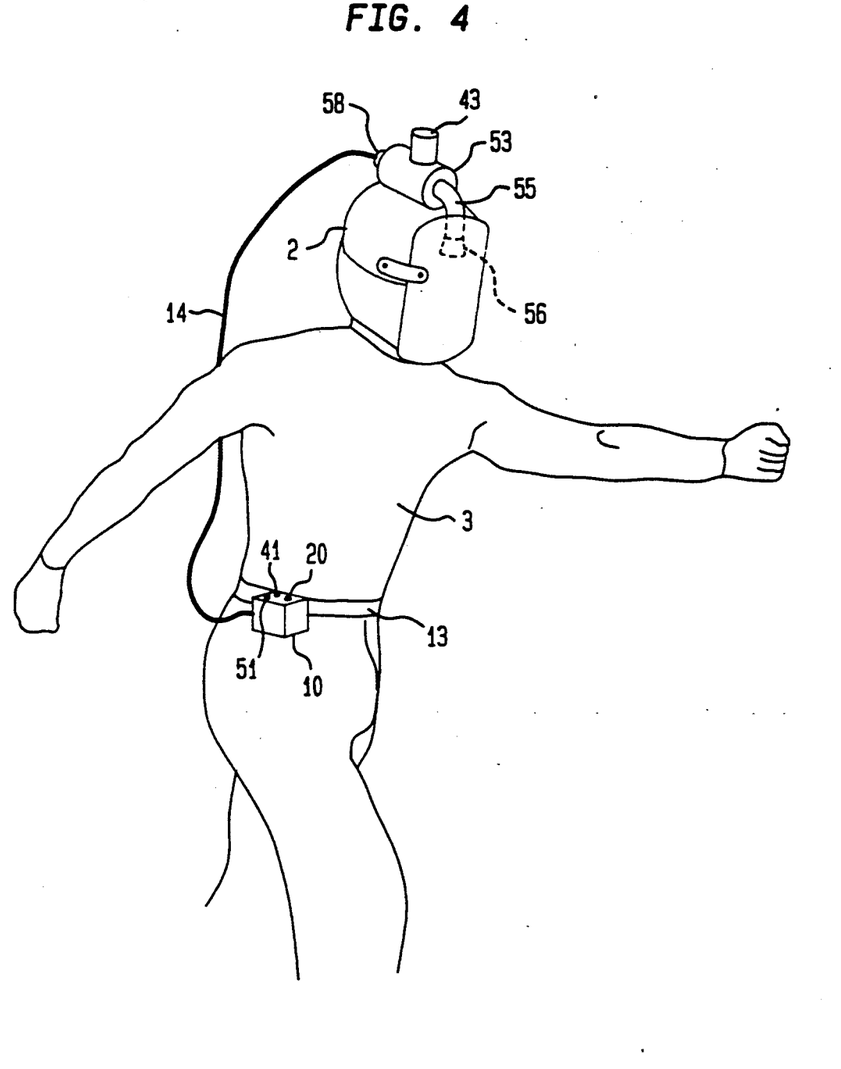
FIG. 4 is a schematic illustration of a typical implementation of the invention showing the housing of the device mounted directly on the upper surface, atop the helmet, and the battery carried on the belt of a worker; a manual selection means is shown mounted on the helmet, and in an alternative embodiment, in phantom view, is shown mounted on the belt of the worker.

FIG. 3 is a cross sectional view of fan housing 53, showing how the major components are arranged in a preferred embodiment. The housing 53 is preferred to be an integral part of the worker's helmet 2 as illustrated by FIG. 4, but the scope of FIG. 3 is confined to the contents of the housing.

The fan housing 53 depicted by FIG. 3 is preferably of thin-walled cylindrical shape, for example of a short 2" diameter tube of sheet metal or synthetic resinous material, such as poly(vinyl chloride) (PVC) having an air filter 54 removably attached at one end and an air duct 55 (not shown) attached at the other end. The housing 53 and its attached components are in fluid-tight engagement, so that air entering filter 54 must leave via duct 55.

As shown by FIG. 3, subminiature fan 50 is located inside housing 53, and is oriented so that it draws air through filter 54 into the housing, and discharges the air from duct 55. Fan 50 is preferred to be lightweight and efficient, rated for 12.5 CFM (ft$^3$/min) of air flow, and with a power consumption of 0.18 amps. The actual air flow rate produced by fan 50 may be significantly less than the rated flow rate, due mostly to flow restriction by filter 54. Actual air flow rates are in the range of 2 to 15 SCFM.

The thermoelectric module 40, previously referred to as TEM 40, is fixedly attached to and penetrates the wall of the housing 53 so that it is partially in the path of air leaving fan 50. TEM 40 comprises an assembly of thermoelectric junction 45, cold heat sink 44, and warm heat sink 43. It is the cold heat sink 44 which is mounted in the path of air leaving fan 50. The warm heat sink 43 is disposed to the exterior side of the housing, while the thermoelectric junction 45 is "sandwiched" between the warm heat sink and the cold heat sink 44.

Thermoelectric junction 45, also described herein as a Peltier device, is a thin rectangular wafer having a warm side and a cold side when powered by an electrical current. A Melcor model CP 1.0-127-08L thermoelectric junction is used in the preferred embodiment, providing a heat flux of approximately 15 to 20 watts over an area of 1.4 square inches when a current of 2 amps is applied at a potential of 12 volts. In the present invention, it is the purpose of the cold side of junction 45 to remove heat from the air passing through housing 53, while it is the purpose of the warm side of junction 45 to dissipate this heat to the room air surrounding the worker. The required means of heat transfer is provided by a pair of heat sinks 43 and 44. Each heat sink comprises a thin flat plate of slightly greater area than the junction 45, where one side of the flat plate is in intimate contact with the junction, and the other side of the plate has long perpendicularly projecting fins for the purpose of increased heat transfer. In the preferred embodiment, cold heat sink 44 comprises a rectangular base plate measuring 1.75 inches wide by 1.75 inches long by 0.1 inches thick, and six rectangular fins each measuring 1 inch high by 1.75 inches long by 0.1 inches thick. The fins of cold heat sink 44 are perpendicularly attached to the base plate in a mutually parallel configuration typical of heat sinks. Cold heat sink 44 provides approximately 24 square inches of surface area for heat exchange with the air flowing through the interior of housing 53. In the preferred embodiment, warm heat sink 43 is identical to cold heat sink 44, except that the fins are 0.625 inches high. The heat sinks 43 and 44 are held in contact with junction 45 and fixedly attached to throughbores in the wall of housing 53 using TEM fastener screw 46, TEM fastener nut 49, and TEM fastener spacers 47 and 48, as shown in FIG. 3. The upper TEM fastener spacer 47 prevents housing 53 from coming into direct contact with warm heat sink 43. TEM fastener lower spacer 48 is slightly thinner than junction 45, and is located between the heat sinks so that the TEM fastener screws serve to force the junction 45 into close contact with heat sinks 43 and 44. The TEM fastener screws 46 are typically composed of plastic, so that there is no electrical or heat conduction between the heat sinks 43 and 44 via the screws.

If a more powerful fan 50 is employed, then a portion of the air flow exiting from fan 50 could be diverted to cool the warm heat sink located on the outside of housing 53. This forced air circulation would improve the efficiency of thermoelectric junction 45, and thus make recharging or replacement of power supply 10 less frequent.

Electrical connections between components located close to the power supply 10 and components located close to the housing 53 are provided by a receptacle 57 attached to the outside of the housing. The precise location of the receptacle 57 shown in FIG. 3 is unimportant, as long as it does not restrict air flow within the housing 53.

Ambient air thermistor Ta is preferably located in the air space between the filter 54 and the fan 50, so that forced convection from the fan will insure good heat transfer between the ambient air thermistor and the air. In FIG. 3, ambient air thermistor Ta is shown attached to the end of a TEM fastener screw 46 which is located close to the fan 50. Cooled air thermistor Tc is shown attached to a TEM fastener screw 46 located on the opposite side of the cold heat sink 44 from the fan 50. Manual switch 20, temperature controller 30, TEM light emitting diode 41, and fan light emitting diode 51 are all attached to upper outside surface of housing 53. The precise locations of the latter components are relatively unimportant, except that the worker should have convenient access to the manual switch and light emitting diodes.

It is thus seen that the switch which provides the worker with means to shut-off the apparatus entirely, or, to select a predetermined temperature difference to control the temperature of the cooled air. The switch may be directly mounted on the housing or helmet, or removably disposed on the person of the wearer, for example by being attached to a belt around the worker's body. The housing is typically elongate and tubular, preferably integrally mounted on the upper surface of the helmet, the housing having an intake end and a discharge end. The fan is mounted within the housing, adjacent its intake end, and connected electrically to the battery for selective on/off operation. Preferably, the air-filter is demountably disposed on the intake of the housing so that all incoming air is filtered. The TEM is mounted through the wall of the housing and connected to the battery to draw current therefrom, so as to provide a heat dissipation side having metallic fins in open communication with the ambient atmosphere, and a heat abstraction side within the housing in heat-conducting association with air flowing through the housing; an "ambient air temperature sensing first thermistor" in temperature sensing association with air flowing through the intake of the housing; and a "cooled air temperature sensing second thermistor", in temperature sensing association with air flowing through the discharge end of the housing. The temperature controller maintains a preselected temperature difference between the aforementioned thermistors by regulating the current supplied to the module, wherein such regulation of the current is responsive to the manually operated switch and the temperatures of the thermistors; a thin cable connects the battery and manual selection means to operate the aforementioned components contained in the housing. The air-duct attached at one end to the discharge end of the housing, preferably has a nozzle attached to the other end of the air-duct, the nozzle being directed to flow cooled, filtered air slowly across the worker's face.

The device shown in FIG. 3 works as follows: subminiature fan 50 draws air through filter 54, thus removing undesirable contaminants from the air; the air exhausted from fan 50 is forced into contact with the cold heat sink 44, which has been cooled by the action of junction 45 and warm heat sink 43; cooled air leaving the vicinity of the cold heat sink 44 exits the housing 53 and soon comes in close contact with the worker's face, thus providing comfort. The control of fan 50 and TEM 40 have been previously described herein relative to FIGS. 1 and 2.

An alternative embodiment of the invention is illustrated in FIG. 4, wherein the manual switch 20, TEM light emitting diode 41, and fan light emitting diode 51 are located in close proximity to the power supply. FIG. 4 also shows:

a worker 3 is wearing a helmet 2 which has fan housing 53 as an integral part of the helmet;

the worker 3 of FIG. 3 is also wearing a belt 13 which serves to comfortably bear the weight of the power supply 10 and manual switch 20;

the TEM LED 41 and the fan LED 51 are mounted in close proximity to the manual switch, so that the worker has visual confirmation that the TEM 40 and the fan 50 are operating respectively;

a thin, cable 14 electrically connects the aforementioned components borne on belt 13 to receptacle 57 on the exterior of housing 53, via plug 58;

warm heat sink 43 dissipates heat from the air entering housing 53, so that air exiting the housing through duct 55 is cooler than the ambient air;

cool air exiting duct 55 via nozzle 56 is spread over the face of the worker, thus enhancing the comfort and productivity of the worker.

Mounting the device on the helmet, preferably centrally thereon, allows the air-duct from the discharge end of the housing to be less than about 1 ft (0.3 meter) long. Such a short duct presents a negligible pressure drop and allows the use of a miniature fan means to blow the air through the housing.

In another embodiment the housing may be removably mounted on the helmet. Further, to provide the worker with greater control over his comfort, as well as the rate of power consumption, a controller means and an additional manual switch to control fan speed, may be used.

Still further embodiments may utilize a filter 54 which is also bacteriostatic, includes a deodorizer for removing objectionable odors, or, means for removing dangerous airborne contamination.

Having thus provided a general discussion, described the overall device in detail and illustrated the invention with a specific example of the best mode of making and using the invention, it will be evident that the invention has provided a surprisingly effective solution to a difficult problem. It is therefore to be understood that no undue restrictions are to be imposed by reason of the specific embodiment illustrated and discussed, except as provided by the following claims.

I claim:

1. A body-mountable apparatus for maintaining personal comfort of a person subjected to heat while wearing a helmet, by flowing cooled ambient air across said person's face only, said apparatus comprising, battery means removably mounted on said body;

a housing mounted on the surface of said helmet, said housing having an intake end for ambient air, and a discharge end for cooled air;

fan means mounted within said housing, adjacent said intake end, and electrically connectable to said battery means for selective on/off operation;

thermoelectric module means mounted through the wall of said housing and electrically connectable to said battery means, said module having a heat dissipation side, and, a heat abstraction side disposed within said housing, said heat abstraction side being in heat-conducting association with air flowing through said housing;

a first thermistor, upstream of said heat abstraction side, in temperature sensing association with air flowing through said intake end of said housing;

a second thermistor, downstream of said heat abstraction side, in temperature sensing association with air flowing to said discharge end;

manual selection means for selecting the temperature of air discharged from said housing;

temperature control means in operative communication with said manual selection means and said first and second thermistor means, and adapted to maintain a predetermined temperature difference between said first and second thermistors by regulating current supplied to said module, wherein such regulation of current is responsive to said manual selection means and the temperatures sensed by said first and second thermistors;

air-duct means attached at its one end to said discharge end of said housing, its other end terminating in front of said person's face to flow cooled air across said face; whereby said person wearing said helmet has untethered mobility.

2. The apparatus of claim 1 wherein said manual selection means is a switch for setting a desired temperature difference in the range from about 1° F. to 7° F. (1° C. to 4° C.) and selectively shuts off operation of said apparatus.

3. The apparatus of claim 2 wherein said switch is mounted directly upon said housing.

4. The apparatus of claim 2 wherein said switch is disposed on the body of said person, but distally disposed relative to said housing.

5. The apparatus of claim 1 including an air-filter demountably disposed on said intake end of said housing to filter incoming air.

6. The apparatus of claim 1 wherein said other end of said duct is provided with a nozzle means to direct said air across said face.

7. The apparatus of claim 1 wherein temperature of cooled air sensed by said second thermistor relative to ambient temperature is lower when said ambient temperature is highest and said desired temperature difference set is maximum.

8. The apparatus of claim 1 wherein said thermoelectric module is a Peltier-effect device and said heat dissipation side includes metallic fin means in open communication with the ambient atmosphere.

9. The apparatus of claim 1 wherein said air-duct means is less than about 1 ft (0.3 meter) long.

10. The apparatus of claim 1 wherein said fan means provides from 3 SCFM to 15 SCFM of air.

11. The apparatus of claim 1 wherein said housing is removably mounted on said helmet.

12. The apparatus of claim 1 wherein said housing is integrally formed on said helmet.

13. The apparatus of claim 1 wherein said battery means provides 9 volts.

14. The apparatus of claim 8 wherein said thermoelectric module is a single module.

* * * * *